March 4, 1969
R. E. MITTON
3,430,660
PRESSURE EQUALIZER APPARATUS FOR
HYDRAULIC BRAKE FLUID SYSTEMS
Filed March 21, 1966
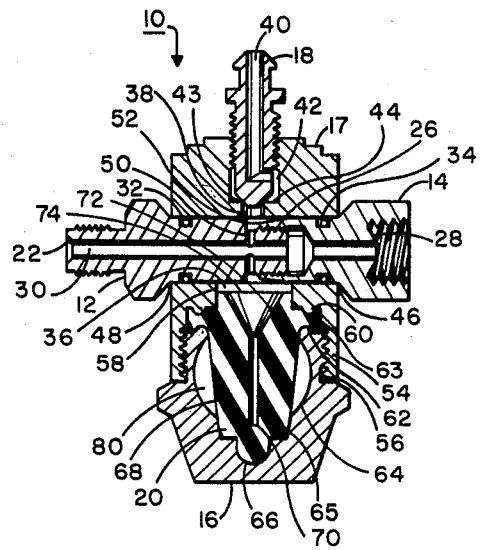
FIG. 1
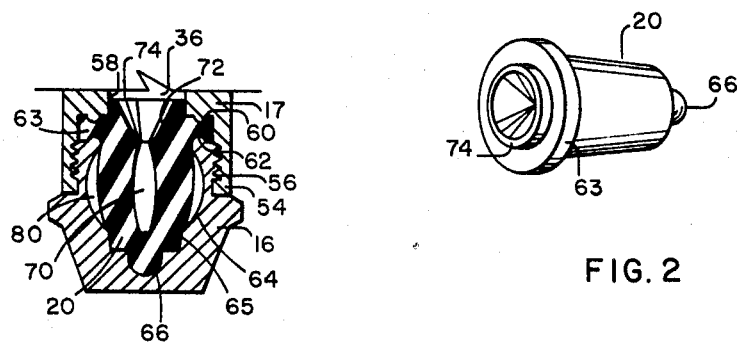
FIG. 3
FIG. 2
INVENTOR.
ROBERT E. MITTON
BY *Carl R. Brown*

United States Patent Office

3,430,660
Patented Mar. 4, 1969

3,430,660
PRESSURE EQUALIZER APPARATUS FOR HYDRAULIC BRAKE FLUID SYSTEMS
Robert E. Mitton, 349 Spreckles Bldg., San Diego, Calif. 92101
Filed Mar. 21, 1966, Ser. No. 536,088
U.S. Cl. 138—30      2 Claims
Int. Cl. F16l 55/04; B60t 17/00

ABSTRACT OF THE DISCLOSURE

A pressure equalizer apparatus for hydraulic brake fluid systems that has means for neutralizing shock waves occurring in the fluid, and that has means for equalizing the hydraulic fluid pressure applied to the individual braking mechanisms at each wheel.

---

In conventional hydraulic brake systems when the actuating member, such as a foot pedal, is depressed; pressure is exerted on the trapped hydraulic fluid. This pressure is transmitted through the non-compressible fluid to move the brake shoes. In such a system, the fluid is supposed to exert equal pressure on each brake shoe.

While this is true in theory, the actual pressure between the brake shoes and the drums on all the wheels, because of dimensional factors, may not be constant at all times. There is a concentricity relationship between shoes and drums, that, in simple terms, might be described as an "out of round" condition. As the drum rotates, the contact pressure between the drum and shoe will vary as the shoe is pushed against the high and low spots on the drum. Brake fluid, not being compressible, when under pressure acts almost like a solid rod or piece of steel. Thus as long as the brake pedal is held down, the hydraulic fluid in the lines and cylinders does not change in volume, and the pressure on the fluid rises and falls somewhat in proportion to the extent the brake drum is out of round. When the shoe contacts a high spot, it squeezes tighter against the drum, with a corresponding increase in drum friction, causing possible lock-up of this particular wheel. With one or more wheels still turning, there can be an unequal transmission of braking effort from wheels to roadway that can result in an uncontrollable skid. Further the rapid contact of the brake shoes against the "out of round" drum creates shock waves in the noncompressible fluid that can exert tremendous shock forces against the various parts of the entire braking system. Such shock waves can cause deterioration of the fluid lines of the system leading to rupture of the system with resultant loss of brakes. Such loss of brakes or skidding, coming at an inopportune time, can create an extremely dangerous and hazardous situation.

Therefore it is an object of this invention to provide a new and improved pressure equalizer apparatus for hydraulic brake systems.

It is another object of this invention to provide a new and improved apparatus for neutralizing shock waves in the brake fluid systems.

It is another object of this invention to provide a new and improved apparatus for equalizing hydraulic pressure at all wheels in a braking system.

It is another object of this invention to provide a new and improved apparatus for restricting the occurance of wheel lock, dangerous side skidding and other like occurrences that result in the panic stop of automotive vehicles.

It is another object of this invention to provide a new and improved pressure equalizer apparatus for hydraulic brake systems that may be incorporated into new brake systems or that may be easily inserted into existing hydraulic brake systems.

To accomplish the foregoing, the pressure equalizer apparatus of my invention is in the fluid system of a hydraulic brake system somewhere between the point of exerting the pressure and the fluid pressure actuating motors that move the brake shoes. The apparatus includes a hollow bulb with resilient, expansible walls that receives portions of the brake fluid. Thus when a given amount of pressure is exerted on the brake fluid, the fluid expands the bulb. In expanding, the outer wall of the bulb expands against the curved inner surface of an enclosing housing. A compressible material, such as air, is trapped between the bulb and the inner surface. This trapped air is pressurized in proportion to the pressure applied to the fluid and this compressed air pressure exerts a constant resilient back pressure through the walls of the bulb to the fluid.

Normally the bulb will have sufficient structural strength to resist expansion under the hydraulic fluid pressure until a given minimum pressure has been exceeded. While the given minimum pressure may be selectively set, it would be expected to restrict major expansion of the bulb to those instances where rapid stops are expected from the braking system. The inner surface of the housing or the cavity has a uniform arcuate or concave configuration that permits a uniform sideward expansion of the bulb wall to obtain the greatest overall back pressure distribution over the bulb wall. My invention also has a unique combination constructed that assures efficient and simple sealing against the high pressures involved, that has a fail safe construction in event of bulb collapse, that can be bled of unwanted gases and also that has a sump capability for collecting impurities or sludge in the system. The structure is easily disassembled for replacement of parts or inspection of the operation of the system and is easily reassembled and purged of air to assure correct and continued operation.

Thus when my invention is in a hydraulic brake system, the brake fluid pressure during extreme braking is automatically balanced by a "relief valve" action. The friction pressure on the brake shoes against the drums remains substantially constant regardless of the out-of-round condition of the brake drums in any one or all of the wheels. Thus the unit allows the brake fluid pressure in the lines to fluctuate as necessary, permitting any high spots in brake drums to pass around while maintaining the extreme pressure (as in a panic stop) on the brake drums. This constant hydraulic pressure and uniform coefficient of drum friction in each wheel during the cycle of rotation results in an even, completely controlled stopping of the car. Thus uncontrollability of a car when stopping at high speeds can be reduced or eliminated. Further my invention also allows shocks in the system resulting from the out-of-round relationship of brake drums and brake shoes to be absorbed, thus neutralizing the shock forces that exert extreme strains and forces on the fluid system.

These and other objects and features of this invention will become more apparent from the following description and accompanying drawings, wherein:

FIGURE 1 is a side view cross-section of an embodiment of my invention.

FIGURE 2 is a perspective view of an embodiment of the resilient bulb of my invention.

FIGURE 3 is an in-part cross-sectional view of the bulb in my invention being expanded by hydraulic fluid.

Referring now to FIGURE 1, an embodiment 10 of my invention has a housing 17 with an inlet member 12 and an outlet member 14. These inlet 12 and outlet 14 members connect the apparatus into a normal hydraulic brake system. As an example the apparatus 10 may be readily connected directly to the output of the master cylinder in a motor car. The outer end may then be connected to the output line that otherwise was connected to the master cylinder's discharge. My invention may also be made integral with the master cylinder or located at the wheels of a vehicle in the brake fluid system at that point.

The input connector 12 has male threads and an inwardly directed conical opening for connecting to a similar leak preventing connection. The output connector 14 has a similar reversed internal conical bore 28 that mates to a discharge line (not shown).

The joined ends of the two connectors 12 and 14 have mating threads 26 that draw the connectors together within the housing 17. The outer edges 48 of the opening 46 through the housing 17 has preferably 90 degree corners that form sharp edges 48. These edges 48 coact with the conical shoulders of connectors 12 and 14 and make a fluid tight connection when connectors 12 and 14 are drawn together as shown. O rings 32 and 34 also aid in maintaining a tight fluid seal to prevent leakage of hydraulic fluid around the connectors 12 and 14.

A through passage 30 carries hydraulic fluid through the apparatus from the receiving connector 12 out the discharge connector 14. Housing 17 has a circular opening 36 below the passage 30 and a smaller upper opening 38. The fluid in passage 32 reaches these two openings through connecting aperture 50 in the end of member 12. A bleed valve 18 having the normal end configuration for connecting to a discharge tube threadably fits into the upper aperture 42. The passage 40 connects volume 42 with the atmosphere. A sharp edged shoulder 44 forms a valve seat for the bleed valves conical end 43 to seal volume 42 from volume 38 when the bleed valve is turned to the closed position. The end of member 14 that threadably engages the end of member 12 has a conical taper 52 that further opens the way for fluid and air to pass from passage 30 and volume 36 through aperture 50 into volume 43 and into volume 42 when the bleed valve is open.

A cylindrical member 16 is attached by threads 56 to member 17 and has a concave or arcuate shaped cavity 64 that is open to opening 36. A resilient bulb 20 fits into the cavity 64. The bulb (see FIGURE 2) has a cylindrical shape with a slightly conical taper 68 and a circular bore 70 that is open to opening 36 when fitted into housing 17. A conically divergent opening 72 forms a skirt that is bordered by flange 63. Bulb member 20 is made of resilient material such as natural rubber or other suitable synthetic materials that are resistent to the fluids used in hydradulic brake systems.

The bottom of cavity 64 has a configuration that exactly conforms to the outer configuration of the resilient bulb member 20. Thus the resilient bulb 20, when fitted therein, is resiliently held. The upper facing surface of the cap member 16 has a ring shaped projection 62 that coacts with a similarly shaped projection 46 on the facing surface of housing 17 to contract flange 63 therebetween and prevent fluid leakage through threads 56. The outer circumference of the bulb is slightly larger than the inner diameter of the bead 62, so the bulb is slightly contracted when fitted into the cavity 64. The outer circumference of the skirt 74 fits flat against the inner wall of volume 36 of the housing 17. With the inner diameter of the bead member 62 being smaller than the diameter of projection 60, when cap member 16 is screwed onto the housing member 17; the projections 60 and 62 coact to pull the skirt 74 radially outward. This causes the skirt 74 to grip the inner surface of cavity 36 and exert greater sealing force against fluid leakage through threads 56.

It may be seen that the concaved inner surface 64 forms a symmetrical volume for receiving uniform radial expansion of the walls 68 of the bulb member 20 when fluid expands the central recess 70. The volume 80 will have air or other suitable compressible material that is trapped or sealed therein. This trapped air is compressed by outward expansion of the bulb walls 68 and thus acquired a pressure that is proportionate to the pressure of the hydraulic fluid in passage 30.

*Operation*

In operation, the apparatus is assembled as shown in FIGURE 1 and hydraulic fluid flows in passages 30 and 50 and cavities 36 and 38. Bleeder valve 18 is operated as previously described to bleed trapped air from the system. The apparatus is then in condition for normal operation. When pressure is exerted on a master cylinder or the like, pressure is exerted on the hydraulic fluid. This causes the fluid in volume 70 to expand the bulb 20. Generally, as an example only, the walls 68 will have sufficient strength to require approximately one hundred pounds per square inch pressure before the side walls 68 of the bulb member 20 will expand. Thus in normal slight braking operations the bulb 20 may not receive sufficient hydraulic pressure to expand. However, when pressure in excess of that is applied to the fluid system, then the fluid in cavity 70 expands the bulb sides 68 substantially as shown in FIGURE 3. The amount of fluid that the bulb can accept will depend upon the size of the entire brake system, but normally it would only amount to a few cc.'s. As the bulb expands and the air is contracted within cavity 80, the air pressure increases in proportion to the pressure on the hydraulic fluid in cavity 70. The outer resilient wall member 68 is expanded uniformally along its surface, creating a uniform back pressure of trapped air on its outer surface. This maintains a constant uniform resilient back pressure against the expansion of hydraulic fluid 70. It may thus be seen that any shock waves received by the fluid due to the previously described out-of-round condition between brake drum and brake shoe will be absorbed in the resilient wall 68 and the resilient shock absorbing cushion of air in volume 80.

The housing 17 and cap 16 may be made of any suitable material, such as, for example, 24 S.T. Stainless Aluminum Bar Stock. The connectors 12 and 14 may be made of steel or other suitable materials.

What I claim is:

1. Pressure equalizer apparatus for hydraulic brake fluid systems comprising,
   fluid tight housing means for being positioned in said fluid systems and having hydraulic fluid under pressure passing therethrough,
   said housing means having a fluid receiving cavity therein,
   a substantial portion of said cavity having a concave shaped wall,
   hollow resilient bulb means capable of being positioned in said cavity and having straight sides adjacent said concave shaped wall for receiving said hydraulic fluid and expanding outwardly into said concave portions when the pressure on said fluid exceeds the resilience of said sides,
   said concave portions containing a resilient compressible substance that resists expansion of said bulb,
   said cavity wall is circular and said concave portion is a symmetrical arcuate radial groove,
   said sides of said bulb have a conical taper toward the bottom of said cavity,
   the bottom of said cavity has a shaped recess with inner dimensions and shape substantially equal to the outer dimensions of the end of said bulb and a portion of said sides for snugly receiving said bulb end,
   said cavity comprises a cap member that is threadably secured to said housing,
   said bulb has a radial flange means for fitting between opposing faces of said cavity member and said housing member and sealing said connection,
   said opposing faces have ring shaped projections for contacting and constricting said resilient flange and thereby increasing the effectiveness of said seal,
   said bulb has an upper cylindrically shaped skirt with a conical inwardly directed surface,
   the outer surface of said skirt fitting against the inner surface of said housing, said ring shape projection on said housing being positioned radially outward from said ring shaped projection of said cavity whereby when said cavity member is joined with said housing said flange is twisted causing said outer surface of said skirt to be further resiliently biased against said housing.

2. Pressure equalizer apparatus as defined in claim 1 wherein said compressible substance is a gas.

References Cited

UNITED STATES PATENTS

| | | | |
|---|---|---|---|
| 1,974,323 | 9/1934 | Allen | 138—30 X |
| 2,371,633 | 3/1945 | Lippincott | 138—30 |
| 2,604,118 | 7/1952 | Greer | 138—30 |
| 2,808,070 | 10/1957 | Malsbary | 138—26 |
| 2,941,549 | 6/1960 | Mard | 138—30 |
| 3,159,182 | 12/1964 | Peters | 138—30 |

FOREIGN PATENTS

| | | |
|---|---|---|
| 911,265 | 11/1962 | Great Britain. |
| 1,373,140 | 4/1964 | France. |

SAMUEL ROTHBERG, *Primary Examiner.*

EDWARD J. EARLS, *Assistant Examiner.*

U.S. Cl. X.R.

303—87